(12) United States Patent
Li et al.

(10) Patent No.: US 10,446,939 B2
(45) Date of Patent: Oct. 15, 2019

(54) LIQUID-CRYSTAL ANTENNA APPARATUS AND ELECTRONIC COMMUNICATION DEVICE

(71) Applicant: InnoLux Corporation, Miao-Li County (TW)

(72) Inventors: I-Yin Li, Miao-Li County (TW); Chin-Lung Ting, Miao-Li County (TW); Chung-Kuang Wei, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 15/865,443

(22) Filed: Jan. 9, 2018

(65) Prior Publication Data

US 2018/0205156 A1 Jul. 19, 2018

Related U.S. Application Data

(60) Provisional application No. 62/446,581, filed on Jan. 16, 2017.

(30) Foreign Application Priority Data

Feb. 13, 2017 (CN) .......................... 2017 1 0076371

(51) Int. Cl.
*G02F 1/1333* (2006.01)
*H01Q 21/06* (2006.01)
*H01Q 1/38* (2006.01)
*H01Q 5/15* (2015.01)
*H01Q 21/24* (2006.01)
*G02F 1/13* (2006.01)

(52) U.S. Cl.
CPC .......... *H01Q 21/061* (2013.01); *G02F 1/1313* (2013.01); *G02F 1/133382* (2013.01); *G02F 1/133385* (2013.01); *H01Q 1/38* (2013.01); *H01Q 5/15* (2015.01); *H01Q 21/245* (2013.01)

(58) Field of Classification Search
None
See application file for complete search history.

(56) References Cited

U.S. PATENT DOCUMENTS

2017/0346176 A1* 11/2017 Linn .................. H01Q 1/405
2018/0062268 A1* 3/2018 Haziza .................. H01L 23/66
(Continued)

*Primary Examiner* — James A Dudek
(74) *Attorney, Agent, or Firm* — McClure, Qualey & Rodack, LLP (57) ABSTRACT

A liquid-crystal antenna apparatus includes a liquid-crystal antenna unit. The liquid-crystal unit includes a first substrate, a second substrate, a first radiator, a second radiator, a main radiator, a liquid-crystal layer, and a temperature sensor. The first substrate includes a first surface and a second surface. The second substrate includes a third surface and a fourth surface, wherein the first surface and the third surface face each other. The first radiator is disposed on the first surface. The second radiator is disposed on the third surface. The main radiator is disposed on the fourth surface and used for emitting wireless signals. The liquid-crystal layer is located between the first radiator and the second radiator. The temperature sensor is disposed on at least one of the first surface, the second surface, the third surface, and the fourth surface.

18 Claims, 8 Drawing Sheets

(56) References Cited

U.S. PATENT DOCUMENTS

2018/0123260 A1\* 5/2018 Sikes ................. H01Q 15/0006
2018/0146511 A1\* 5/2018 Stevenson ................ G01K 7/16
2018/0205148 A1\* 7/2018 Li ........................... H01Q 9/27

\* cited by examiner

LIQUID-CRYSTAL ANTENNA APPARATUS AND ELECTRONIC COMMUNICATION DEVICE

CROSS REFERENCE TO RELATED APPLICATIONS

This application claims the benefit of U.S. Provisional Application No. 62/446,581 filed Jan. 16, 2017, the entirety of which is incorporated by reference herein.

This Application claims priority of China Patent Application No. 201710076371.1, filed on Feb. 13, 2017, the entirety of which is incorporated by reference herein.

BACKGROUND OF THE DISCLOSURE

Field of the Disclosure

The present disclosure relates to an antenna apparatus, and in particular to a liquid-crystal antenna apparatus and an electronic communication device using the same.

Description of the Related Art

In a liquid-crystal antenna unit, the birefringence characteristics of liquid crystal are fully utilized. The direction of the liquid-crystal molecules can be controlled by the intensity of the electric field to generate different effective dielectric constants.

In an array of the liquid-crystal antenna unit, electric signals are used to control the arrangement of the liquid-crystal molecules in each liquid-crystal antenna unit to change the dielectric constant of each unit in a radio frequency or millimeter wave system. Thereby, the phase and amplitude of radio frequency or millimeter wave of each antenna unit are controlled. After superposition of all waves, the propagation direction of the wave irradiated by the liquid-crystal antenna unit is the so-called radiation pattern.

Wireless communication using a liquid-crystal antenna apparatus can be applied to every type of vehicle including airplanes, yachts, cars, motorcycles, etc. or to the Internet-of-things, automatic piloting systems, and unmanned vehicles. In comparison with the conventional mechanical antennas, the liquid-crystal antenna apparatus has several advantages such as flatness, lightness, thinness, fast response, and so on.

However, when applied to vehicles, the liquid-crystal antenna apparatus may be placed in environments with large temperature differences. The characteristics of liquid crystal are sensitive to temperature variations. If the influence on the liquid-crystal antenna apparatus due to temperature is not taken into consideration, the liquid-crystal antenna apparatus will lose its original function and work abnormally.

The purpose of the disclosure is to provide a liquid-crystal antenna apparatus and an electronic communication apparatus using the same which can keep the temperature of the liquid crystal in a liquid-crystal antenna stable so that the liquid-crystal antenna works normally under different environmental temperature conditions.

BRIEF SUMMARY OF THE DISCLOSURE

A detailed description is given in the following embodiments with reference to the accompanying drawings.

The disclosure provides a liquid-crystal antenna apparatus including a liquid-crystal antenna unit. The liquid-crystal antenna unit includes a first substrate, a second substrate, a first radiator, a second radiator, a main radiator, a liquid-crystal layer, and a temperature sensor. The first substrate comprises a first surface and a second surface. The second substrate comprises a third surface and a fourth surface. The first surface and the third surface face each other. The first radiator is disposed on the first surface. The second radiator is disposed on the third surface. The main radiator is disposed on the fourth surface. The liquid-crystal layer is located between the first radiator and the second radiator. The temperature sensor is disposed on at least one of the first surface, the second surface, the third surface, and the fourth surface.

The liquid-crystal antenna apparatus further includes a container, a flow generator, and a heater-cooler device. The container accepts the liquid-crystal antenna unit and is filled with a fluid. The flow generator is disposed in the container. The heater-cooler device is disposed in the container to heat or cool the fluid.

The liquid-crystal antenna apparatus further includes a signal control circuit and a temperature control circuit. The signal control circuit is coupled to at least one of the first radiator and the second radiator to control the intensity and phase of the wireless signals. The temperature control circuit controls the heater-cooler device to heat or cool the fluid according to a sense signal that comes from the temperature sensor.

The liquid-crystal antenna apparatus further includes a housing covering the container.

The liquid-crystal antenna apparatus further includes a heat insulation layer located between the container and the housing.

The disclosure provides an electronic communication apparatus including said liquid-crystal antenna apparatus.

According to the above embodiments, the liquid-crystal antenna apparatus of the disclosure uses a container, a flow generator and a heater-cooler device to maintain the temperature of liquid-crystal materials so that the liquid-crystal antenna apparatus works normally under different environmental temperature conditions.

BRIEF DESCRIPTION OF THE DRAWINGS

The present disclosure can be more fully understood by reading the subsequent detailed description and examples with references made to the accompanying drawings, wherein.

DETAILED DESCRIPTION OF THE DISCLOSURE

The following description is embodiments of carrying out the disclosure. This description is made for the purpose of illustrating the general principles of the disclosure and should not be taken in a limiting sense. The scope of the disclosure is best determined by reference to the appended claims.

The following disclosure provides many different embodiments, or examples, for implementing different features of the present disclosure. Specific examples of components and arrangements are described below to simplify the present disclosure. For example, the formation of a first feature over or on a second feature in the description that follows may include embodiments in which the first and second features are formed in direct contact, and may also include embodiments in which additional features may be formed between the first and second features, such that the first and second features may not be in direct contact.

In addition, the present disclosure may repeat reference numerals and/or letters in the various examples. This repetition is for the purpose of simplicity and clarity and does not in itself dictate a relationship between the various embodiments and/or configurations discussed. Furthermore, the shape, size, and thickness in the drawings may not be drawn to scale or simplified for clarity of discussion; rather, these drawings are merely intended for illustration.

Figure 1:
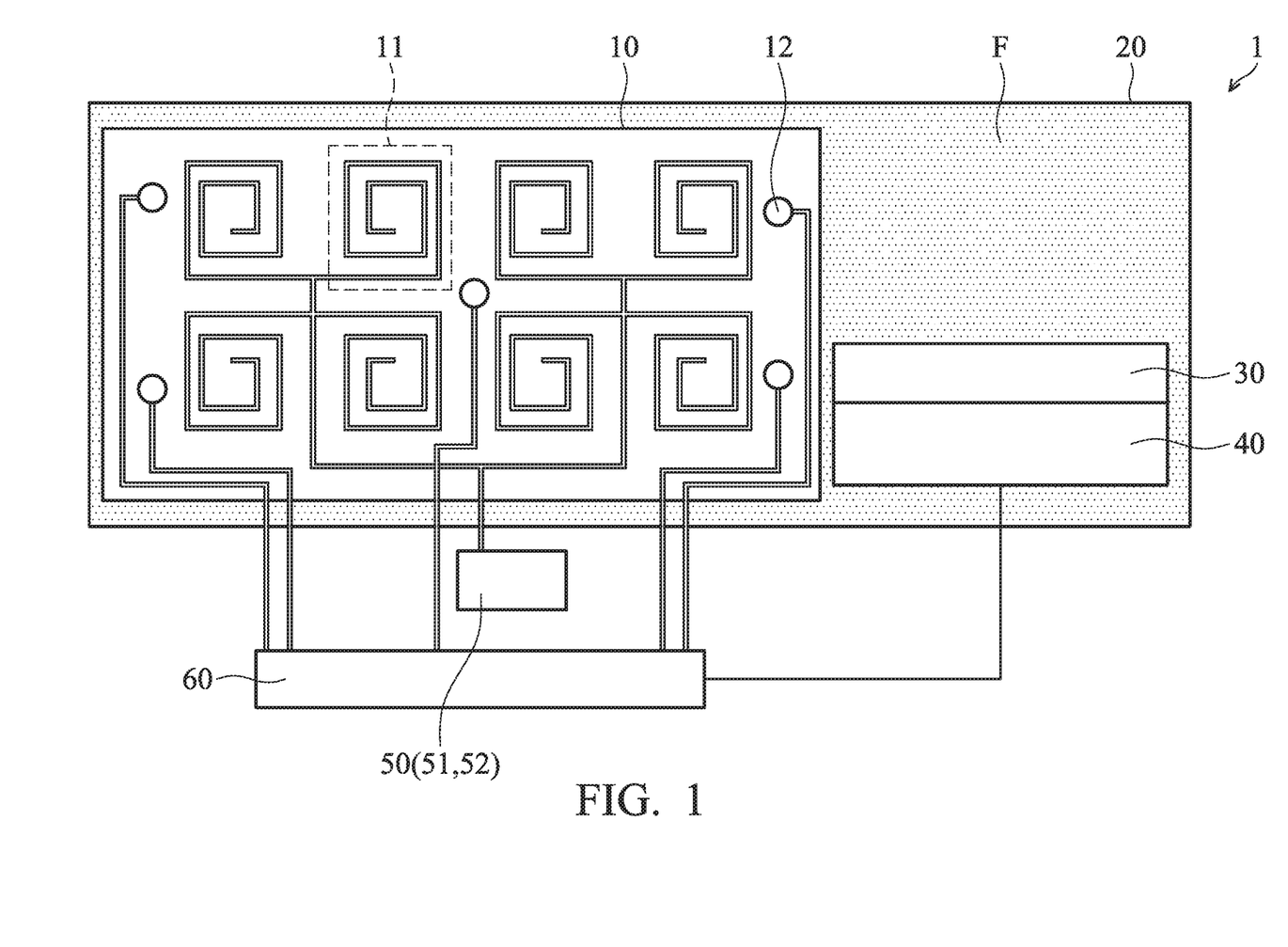
FIG. 1 is a top view showing a liquid-crystal antenna apparatus in accordance with Embodiment 1 of the disclosure.
Figure 2:
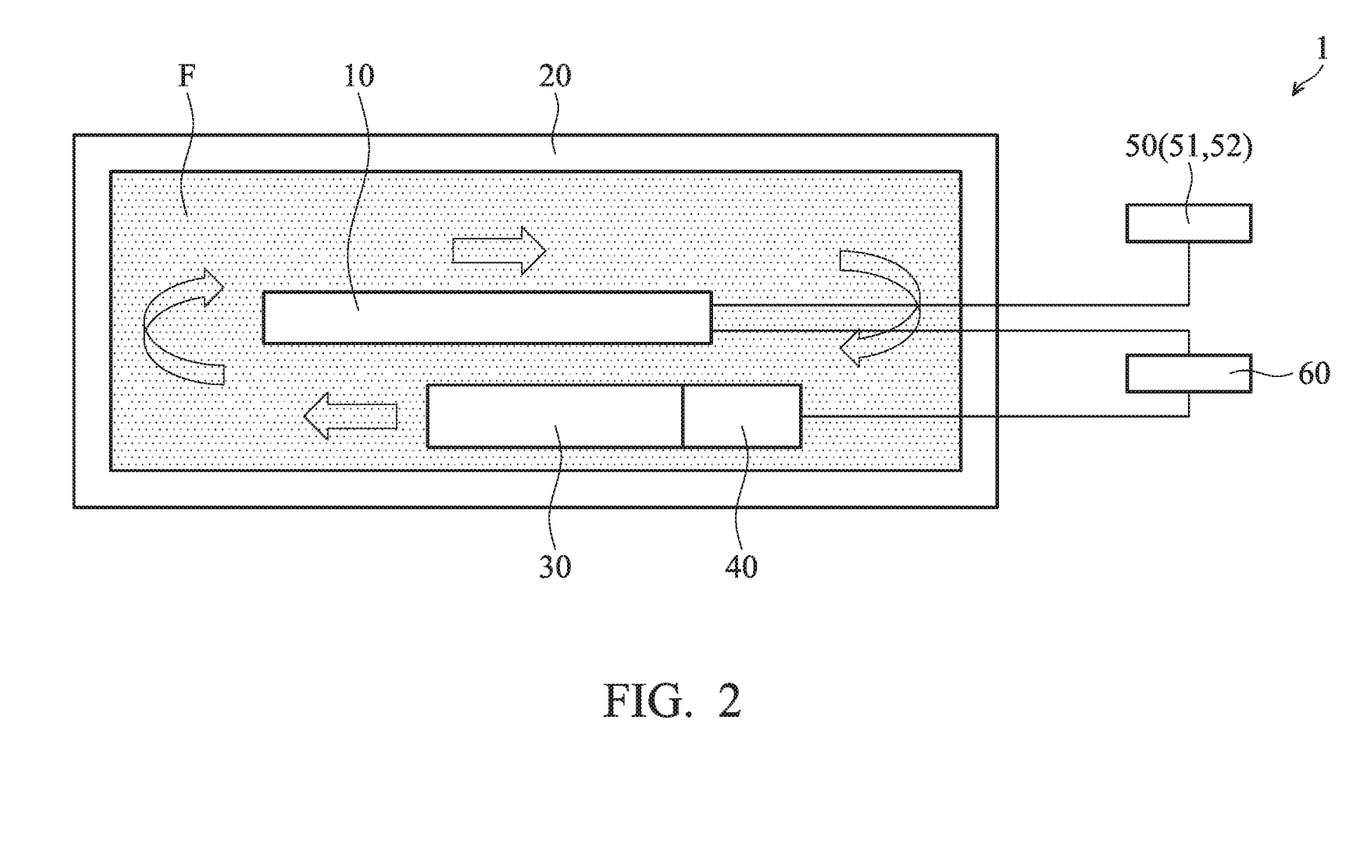
FIG. 2 is a side view showing the liquid-crystal antenna apparatus in accordance with Embodiment 1 of the disclosure.
Figure 3:
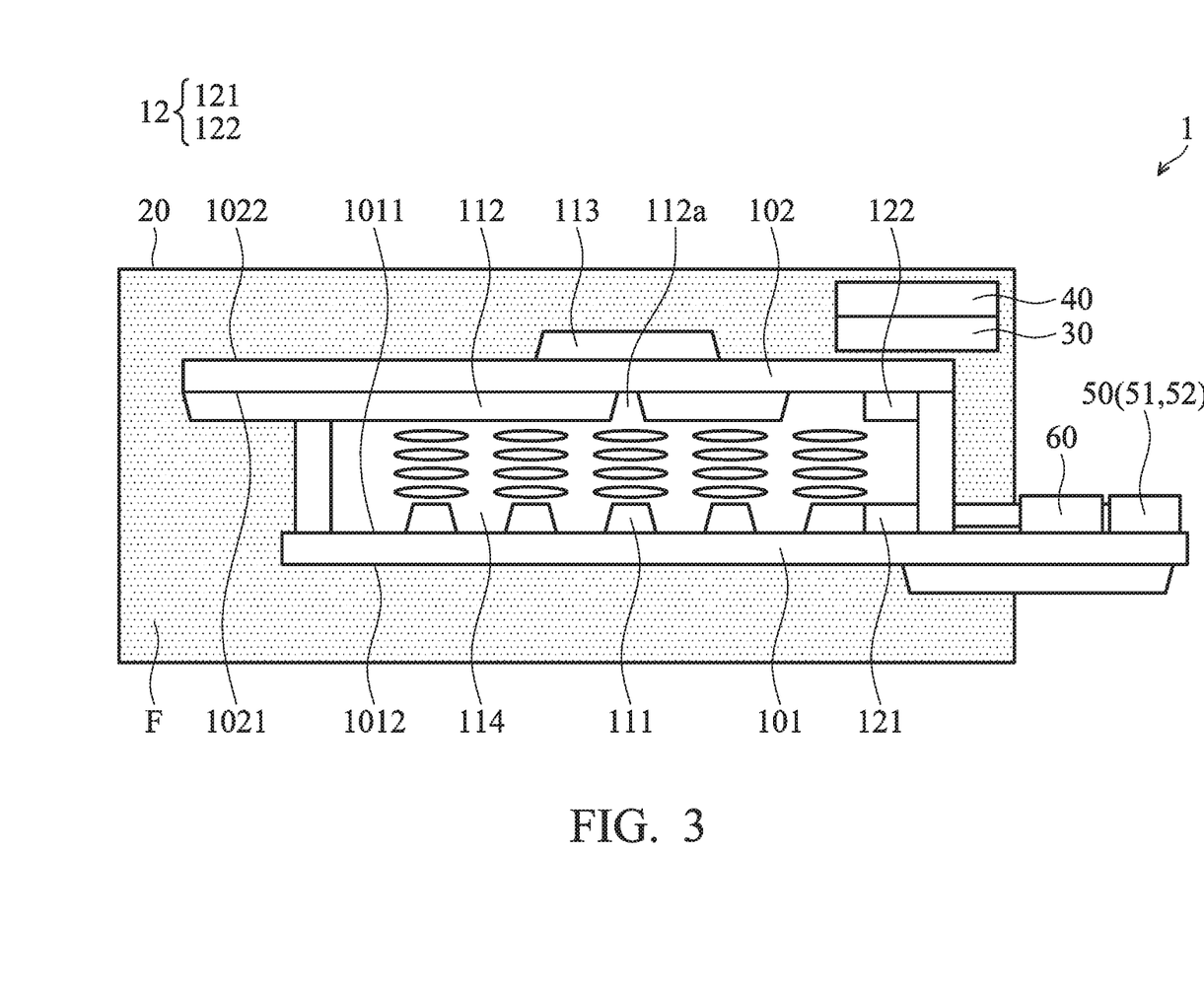
FIG. 3 is a partial sectional view showing the liquid-crystal antenna apparatus in accordance with Embodiment 1 of the disclosure.

FIG. 1 is a top view showing a liquid-crystal antenna apparatus in accordance with Embodiment 1 of the disclosure. FIG. 2 is a side view showing the liquid-crystal antenna apparatus in accordance with Embodiment 1 of the disclosure. FIG. 3 is a partial sectional view showing the liquid-crystal antenna apparatus in accordance with Embodiment 1 of the disclosure. A liquid-crystal antenna apparatus 1 includes a liquid-crystal unit array 10, a container 20, a flow generator 30, a heater-cooler device 40, a signal control circuit 50, and a temperature control circuit 60.

The liquid-crystal unit array 10 has a plurality of liquid-crystal units 11. Each liquid-crystal unit 11 has a section view as shown in FIG. 3. The liquid-crystal unit is formed from a first substrate 101, a second substrate 102, a first radiator 111, a second radiator 112, a main radiator 113, and a liquid-crystal layer 114.

The first substrate 101 is a flat structure which can be made of glass, liquid crystal polymer, polyimide (PI), Polyethylene Terephthalate (PET) or other suitable material. The first radiator 111 is disposed on an upper surface 1011 of the first substrate 101. The first radiator 111 looks like several discontinuous protrusions in the sectional view of FIG. 3, but it is a spiral pattern as shown in the top view of FIG. 1. The first radiator 111 is for generate radio frequency or millimeter wave signals. The second substrate 102 is also a flat structure which can be made of glass, polyimide (PI), Polyethylene Terephthalate (PET) or other suitable material. The second radiator 112 is disposed on a lower surface 1021 of the second substrate 102 which faces the first substrate 101. The second radiator 112 has a feed area 112a. The main radiator 113 is disposed on an upper surface 1022 of the second substrate 102. Namely, the main radiator 113 and the second radiator 112 are formed on opposite sides of the second substrate 102. The main radiator 113 is for radiating wireless signals. The liquid-crystal layer 114 is sealed in a space between the first radiator 111 and the second radiator 112.

According to the above structure, a radio frequency or millimeter wave signal is fed into the first radiator 111 from the signal control circuit 50. The radio frequency or millimeter wave signal passes through the liquid-crystal layer 114 and is fed into the main radiator 113 via the feed area 112a of the second radiator 112. The main radiator 113 radiates the radio frequency or millimeter wave signal as the wireless signal.

Liquid-crystal molecules of the liquid-crystal layer 114 change their direction due to the control of an electric field applied between an electrode (not shown) disposed on the upper surface 1011 of the first substrate 101 and an electrode (not shown) disposed on the lower surface 1021 of the second substrate 102. According to the birefringence characteristics of liquid-crystal molecules, the rotation direction of the liquid-crystal molecules can be adjusted to change the retardation of the liquid-crystal layer 114. Therefore, the phase of the radio frequency or millimeter wave signal can be controlled.

However, liquid-crystal molecules of the liquid-crystal layer 114 are easily affected by the temperature and change their dielectric constant. If the temperature of liquid-crystal molecules deviates too far from the operation temperature, the liquid-crystal antenna apparatus may not work normally. In this regard, the liquid-crystal unit array 10 is placed in the container 20 in the disclosure. Low dielectric loss (for example, $\tan \delta < 0.01$) and good heat insulation (for example, thermal conductivity $k < 0.05$ W/(m·K)) material is preferred for use as the material of the container 20. Therefore, interference with wireless signals (electromagnetic wave signals) and the effect of the external ambient temperature can be reduced. The container 20 is filled with fluid F. The fluid F is a gas or liquid which has low viscosity (for example, $\eta < 0.01$), so as to be a good thermal convection medium.

There are a flow generator 30 and a heater-cooler device 40 disposed in the container 20. The flow generator 30 keeps the fluid F flowing circularly in the container 20 to keep the entire space of the container 20 at a uniform temperature. The heater-cooler device 40 heats or cools the fluid F. When the temperature of the liquid-crystal layer 114 is too low, the heater-cooler device 40 heats the fluid F and the flow generator 30 causes the heated fluid F to flow through the liquid-crystal unit array 10 to increase the temperature of the liquid-crystal unit array 10. On the other hand, when the temperature of the liquid-crystal layer 114 is too high, the heater-cooler device 40 cools the fluid F and the flow generator 30 causes the cooled fluid F to flow through the liquid-crystal unit array 10 to lower the temperature of the liquid-crystal unit array 10. Therefore, the space in the container 20 can be maintained at a substantially constant temperature or within a predetermined temperature range (the temperature in the container 20 with low variation).

In Embodiment 1, a set of the flow generator 30 and the heater-cooler device 40 is used as an example, but the disclosure is not limited thereto. For example, a plurality of sets of flow generator 30 and heater-cooler device 40 can be disposed at different locations in the container 20 to control the temperature locally.

Therefore, in the liquid-crystal antenna apparatus 1, a temperature sensor 12 is necessary to monitor the temperature of the heater-cooler device 40. As shown in FIG. 1, a plurality of temperature sensors 12 are disposed at different respective locations with respect to the liquid-crystal unit array 10 to sense temperature variations in each area. Also, as shown in FIG. 3, the temperature sensor 12 is a capacitive sensor that includes a bottom electrode 121 and a top electrode 122. The bottom electrode 121 is disposed on the upper surface 1011 of the first substrate 101. The top electrode 122 is disposed on the lower surface 1021 of the second substrate 102 and faces the bottom electrode 121. The temperature sensor 12 can sense the capacitance between the two electrodes and thus derive a dielectric constant between the two electrodes. Because the dielectric constant of liquid-crystal material is a function of temperature, the temperature of the liquid-crystal material also can be derived.

Figure 4:
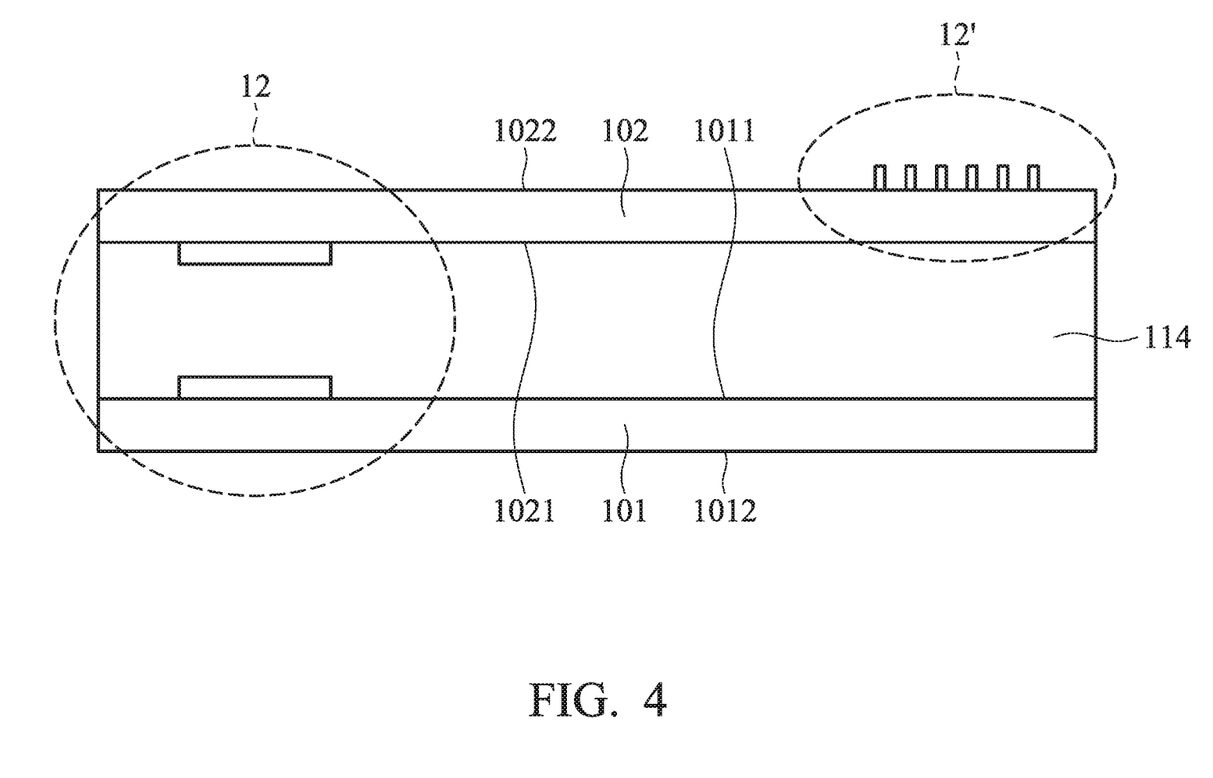
FIG. 4 is a schematic view showing possible arrangements of a temperature sensor for the liquid-crystal antenna apparatus in accordance with Embodiment 1 of the disclosure.

Utilizing the above method, the temperature of the liquid-crystal layer 114 can be sensed at any time and a temperature control operation can be performed immediately. Note that in Embodiment 1, the temperature sensor 12 is a capacitive sensor, but the temperature sensor 12 can be another kind of temperature sensor. FIG. 4 is a schematic view showing possible arrangements of the temperature sensor for the liquid-crystal antenna apparatus in accordance with Embodiment 1 of the disclosure. As shown in FIG. 4, the temperature sensor can not only be a capacitive temperature sensor 12 disposed on the upper surface 1011 of the first substrate 101 and the lower surface 1021 of the second substrate 102, but it can also be a resistive temperature sensor 12' disposed on the lower surface 1012 of the first substrate 101 or the upper surface 1022 of the second substrate 102. The resistive temperature sensor 12' can be, for example, a thermistor. In another embodiment, temperature sensor could be a TFT (transistor) sensor (not shown). No matter what kind of temperature sensor is utilized, the function of sensing the temperature of the liquid-crystal layer 114 can be performed.

The signal control circuit 50 of the liquid-crystal antenna apparatus 1 is coupled to at least one of the first radiator 111 and the second radiator 112 and provides signals to the first radiator 111 and the second radiator 112. The signal control circuit 50 controls the intensity and phase of the wireless signal. The signal control circuit 50 includes a radio-frequency-or-millimeter-wave signal control circuit 51 and a liquid-crystal control circuit 52. The radio-frequency-or-millimeter-wave signal control circuit 51 causes the first radiator 111 and the second radiator 112 to radiate a radio frequency or millimeter wave signal, and to control the intensity of the radio frequency or millimeter wave signal. The liquid-crystal control circuit 52 outputs a potential difference to electrodes of the first radiator 111 and the second radiator 112 and controls the rotation direction of the liquid-crystal molecules of the liquid-crystal layer with an electric field. The liquid-crystal control circuit 52 controls the phase of the radio frequency or millimeter wave signal.

The temperature control circuit 60 of the liquid-crystal antenna apparatus 1 is coupled to each temperature sensor 12 and heater-cooler device 40. The temperature control circuit 60 obtains the temperature of the liquid-crystal layer 114 according to a sense signal transmitted from the temperature sensor 12, and determines whether or not to adjust the temperature. If the temperature is too high, the temperature control circuit 60 sends a control signal to the heater-cooler device 40 and causes the heater-cooler device 40 to cool the fluid F. On the other hand, if the temperature is too low, the temperature control circuit 60 sends a control signal to the heater-cooler device 40 and causes the heater-cooler device 40 to heat the fluid F.

In Embodiment 1, both the signal control circuit 50 and the temperature control circuit 60 are disposed outside the container 20 and on the upper surface 1011 of the first substrate 101 which extends to the exterior of the container 20. The signal control circuit 50 and the temperature control circuit 60 can also be disposed at any location outside the container 20. In addition, the signal control circuit 50 and the temperature control circuit 60 can be integrated as a single control chip.

According to the embodiments, the liquid-crystal unit array 10 is placed in the container 20, and the flow generator 30, the heater-cooler device 40, and the fluid F are used to maintain the temperature of the container 20. Therefore, it could make the liquid-crystal antenna apparatus 1 works normally under different environmental temperature conditions.

Figure 5:
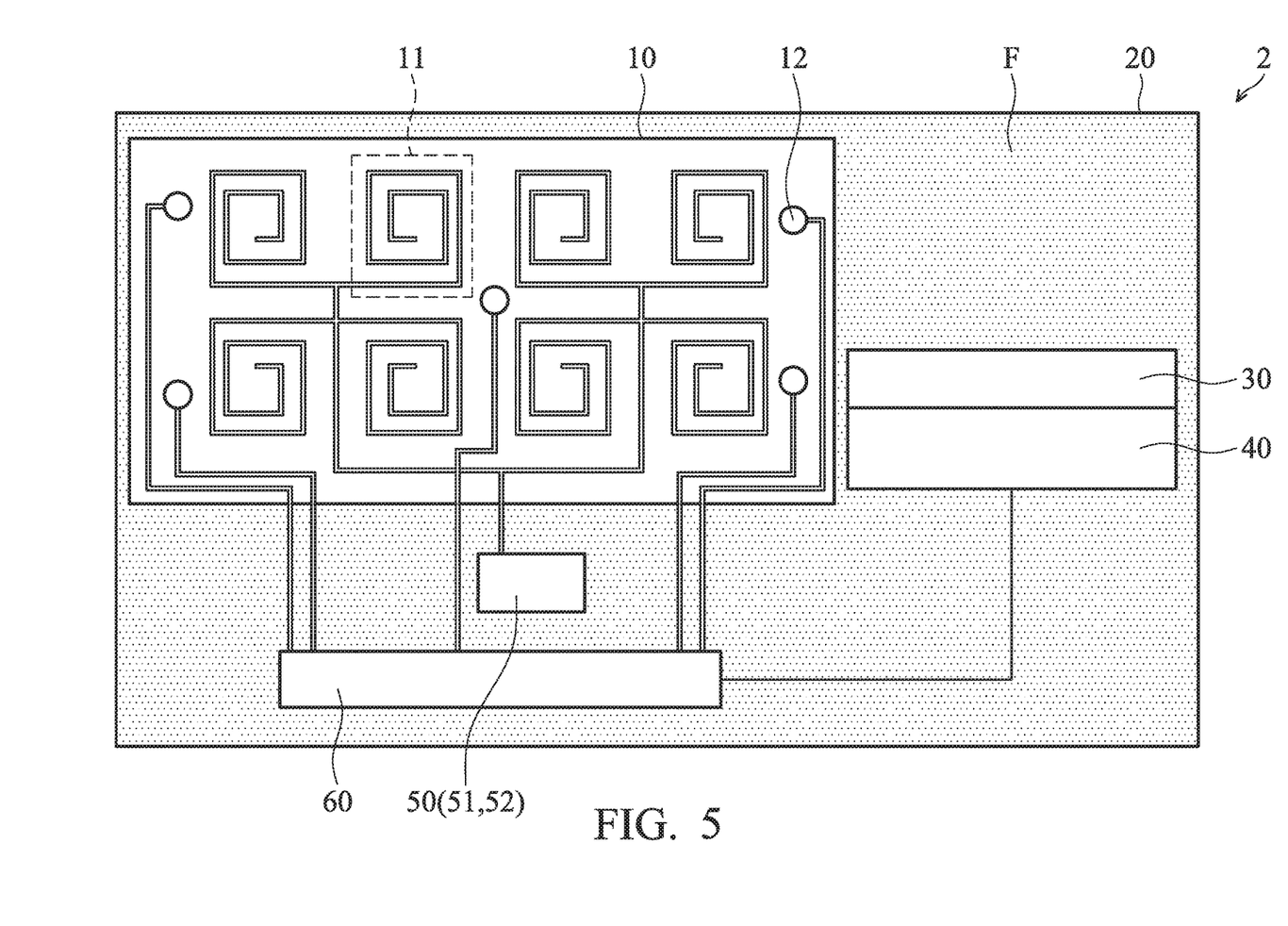
FIG. 5 is a top view showing a liquid-crystal antenna apparatus in accordance with Embodiment 2 of the disclosure.
Figure 6:
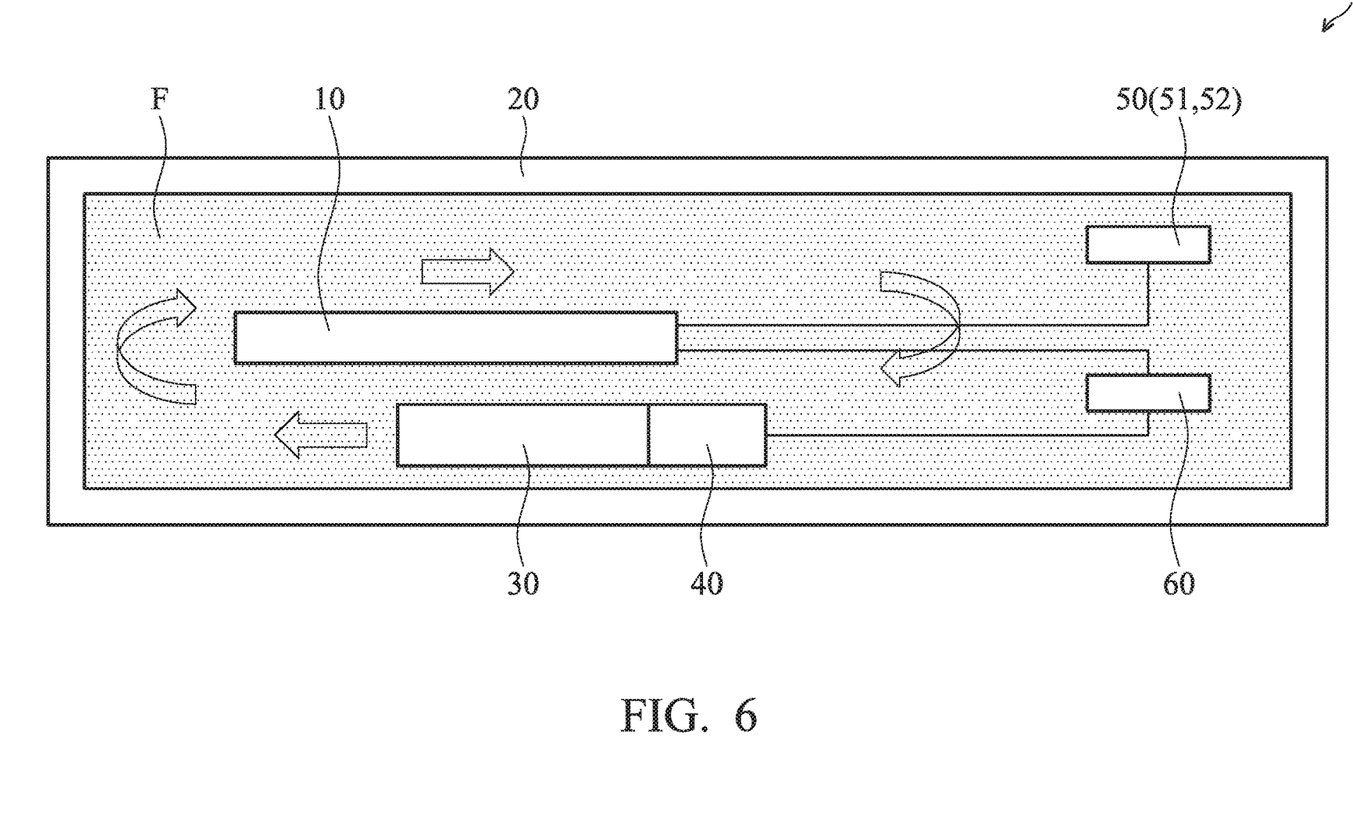
FIG. 6 is a side view showing the liquid-crystal antenna apparatus in accordance with Embodiment 2 of the disclosure.
Figure 7:
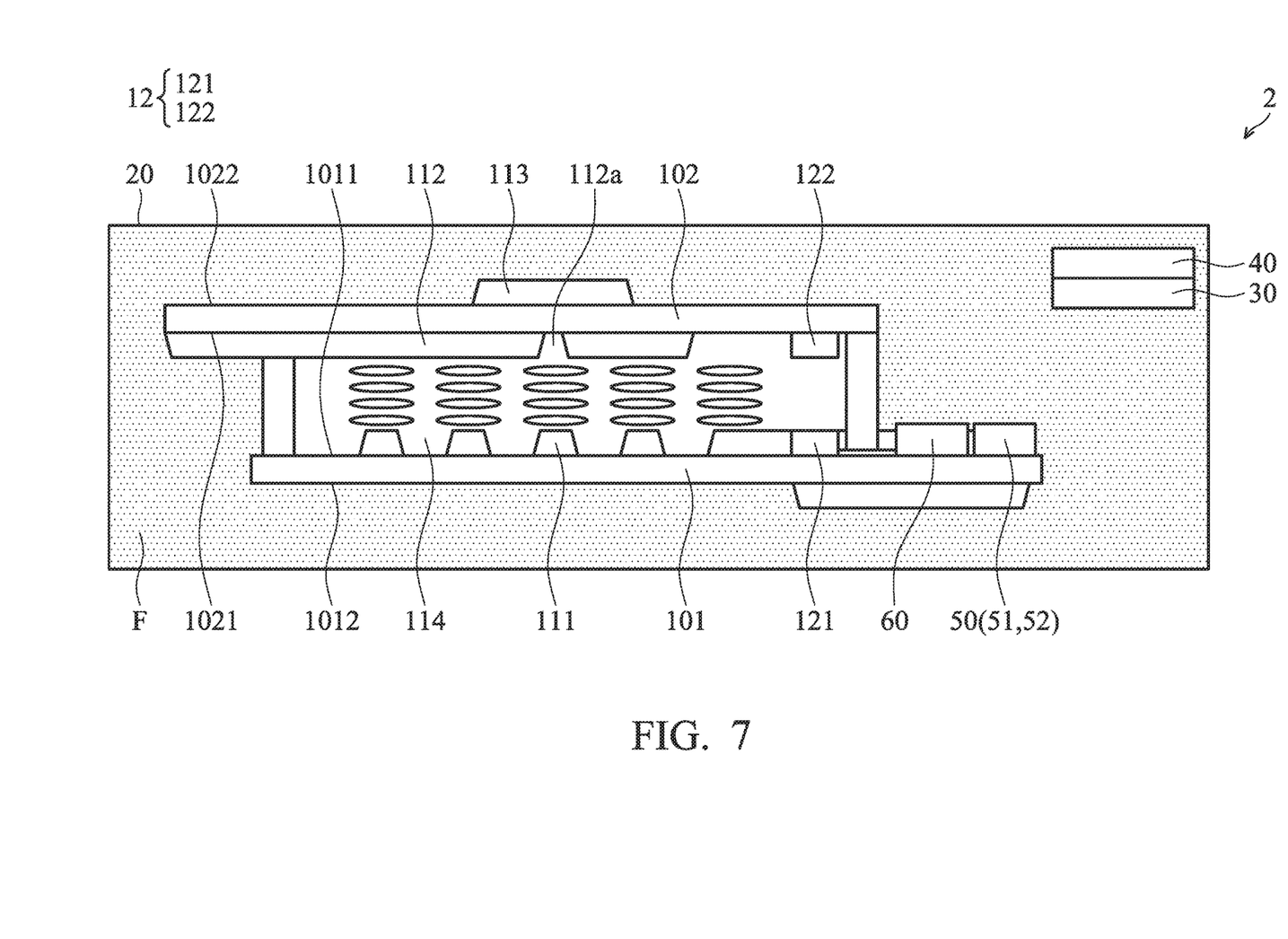
FIG. 7 is a partial sectional view showing the liquid-crystal antenna apparatus in accordance with Embodiment 2 of the disclosure.

FIG. 5 is a top view showing a liquid-crystal antenna apparatus 2 in accordance with Embodiment 2 of the disclosure. FIG. 6 is a side view showing the liquid-crystal antenna apparatus 2 in accordance with Embodiment 2 of the disclosure. FIG. 7 is a partial sectional view showing the liquid-crystal antenna apparatus 2 in accordance with Embodiment 2 of the disclosure. The elements of the liquid-crystal antenna apparatus 2 of Embodiment 2 are the same as those of the liquid-crystal antenna apparatus 1 of Embodiment 1. Namely, the liquid-crystal antenna apparatus 2 includes a liquid-crystal unit array 10, a container 20, a flow generator 30, a heater-cooler device 40, a signal control circuit 50, and a temperature control circuit 60. However, the difference between Embodiment 1 and Embodiment 2 is that the signal control circuit 50 and the temperature control circuit 60 are disposed in the container 20 in Embodiment 2. Despite this difference, the operation, effect, and variation for Embodiment 2 are the same as those for Embodiment 1.

Figure 8:
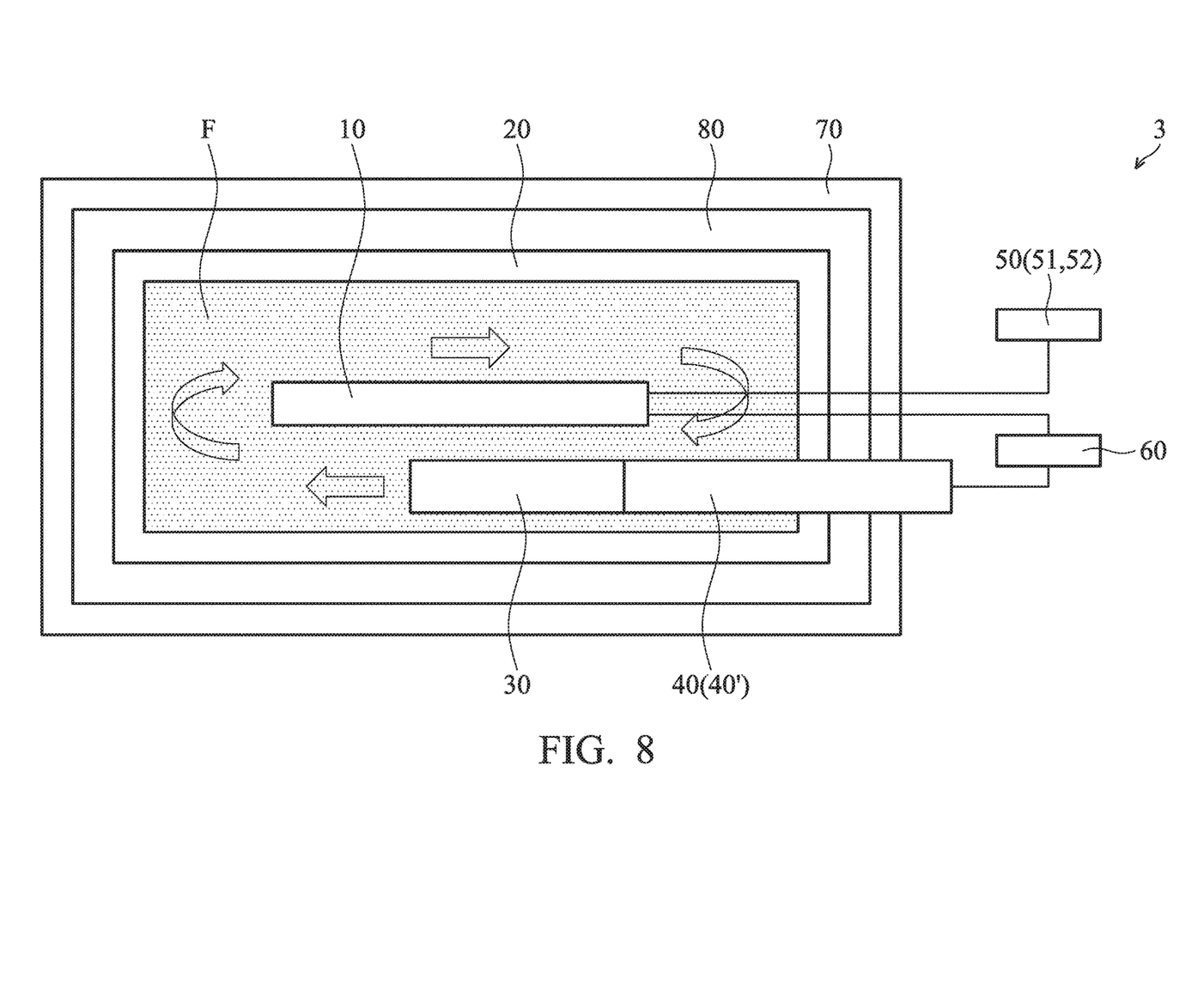
FIG. 8 is a side view showing a liquid-crystal antenna apparatus in accordance with Embodiment 3 of the disclosure.

FIG. 8 is a side view showing a liquid-crystal antenna apparatus 3 in accordance with Embodiment 3 of the disclosure. The elements of the liquid-crystal antenna apparatus 3 of Embodiment 3 are the same as those of the liquid-crystal antenna apparatus 1 of Embodiment 1. Namely, the liquid-crystal antenna apparatus 2 includes a liquid-crystal unit array 10, a container 20, a flow generator 30, a heater-cooler device 40, a signal control circuit 50, and a temperature control circuit 60. However, in order to ensure insulation performance of the container 20, the liquid-crystal antenna apparatus 3 further includes a housing 70 to cover the container 20. The space between the container 20 and the housing 70 is drawn to a vacuum and forms a vacuum insulation layer 80 to further reduce thermal conduction and thermal convection. Note that the heater-cooler device 40 can be a heat exchanger 40', one end of which is inside the container 20 and the other end extends to the exterior of the housing 70. The heat exchanger 40' uses its coolants that flow circularly between the interior of the container 20 and the external environment to perform heat exchange and adjust the temperature of the fluid F in the container 20. The heat exchanger 40' is not limited to a specific type, and can be a plate heat exchanger, a shell and tube heat exchanger, a tube heat exchanger, etc. In addition, the insulation space between the container 20 and the housing 70 is not limited to a vacuum. The insulation space can be filled with materials that have a good insulation effect.

According to the embodiments, the disclosure can maintain the temperature of liquid-crystal material in a liquid-crystal antenna apparatus in a normal working temperature, for example, −30° C.~85° C., so that the liquid-crystal antenna apparatus works normally under different environmental temperature conditions.

The disclosure also provides an electronic communication apparatus having the liquid-crystal antenna apparatus that is disclosed in any of Embodiments 1-3. Those electronic communication apparatus can be applied to every type of vehicle including airplanes, yachts, cars, motorcycles. etc. or to the Internet-of-things, automatic piloting systems, and unmanned vehicles.

While the disclosure has been described by way of example and in terms of the preferred embodiments, it is to be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A liquid-crystal antenna apparatus, comprising:
   a liquid-crystal antenna unit, comprising:
   a first substrate comprising a first surface and a second surface;
   a second substrate comprising a third surface and a fourth surface, wherein the first surface and the third surface face each other;
   a first radiator disposed on the first surface;
   a second radiator disposed on the third surface;
   a main radiator disposed on the fourth surface;
   a liquid-crystal layer located between the first radiator and the second radiator; and
   a temperature sensor disposed on at least one of the first surface, the second surface, the third surface, and the fourth surface,
   wherein the liquid-crystal antenna apparatus further comprises:
   a container accepting the liquid-crystal antenna unit and filled with a fluid;
   a flow generator disposed in the container; and
   a heater-cooler device disposed in the container to heat or cool the fluid.

2. The liquid-crystal antenna apparatus as claimed in claim 1, wherein the temperature sensor is a thermistor disposed on at least one of the second surface and the fourth surface.

3. The liquid-crystal antenna apparatus as claimed in claim 1, wherein the temperature sensor is a capacitive sensor comprising:
   a first electrode disposed on the first surface; and
   a second electrode disposed on the third surface, wherein the second electrode faces the first electrode.

4. The liquid-crystal antenna apparatus as claimed in claim 1, further comprising:
   a signal control circuit coupled to at least one of the first radiator and the second radiator;
   a temperature control circuit controlling the heater-cooler device to heat or cool the fluid according to a sense signal that comes from the temperature sensor.

5. The liquid-crystal antenna apparatus as claimed in claim 4, wherein the signal control circuit comprises:
   a radio-frequency-or-millimeter-wave signal control circuit controlling the first radiator and the second radiator to generate the wireless signals; and
   a liquid-crystal control circuit controlling the direction of liquid-crystal molecules of the liquid-crystal layer.

6. The liquid-crystal antenna apparatus as claimed in claim 4, wherein the signal control circuit and the temperature control circuit are disposed in the container.

7. The liquid-crystal antenna apparatus as claimed in claim 4, wherein the signal control circuit and the temperature control circuit are disposed outside the container.

8. The liquid-crystal antenna apparatus as claimed in claim 1, wherein the heater-cooler device is a heat exchanger.

9. The liquid-crystal antenna apparatus as claimed in claim 1, further comprising:
   a housing covering the container; and
   a heat insulation layer located between the container and the housing.

10. An electronic communication apparatus, comprising:
    a liquid-crystal antenna unit, comprising:
    a first substrate comprising a first surface and a second surface;
    a second substrate comprising a third surface and a fourth surface, wherein the first surface and the third surface face each other;
    a first radiator disposed on the first surface;
    a second radiator disposed on the third surface;
    a main radiator disposed on the fourth surface;
    a liquid-crystal layer located between the first radiator and the second radiator; and
    a temperature sensor disposed on at least one of the first surface, the second surface, the third surface, and the fourth surface,
    wherein the electronic communication apparatus comprises:
    a container accepting the liquid-crystal antenna unit and filled with a fluid;
    a flow generator disposed in the container; and
    a heater-cooler device disposed in the container to heat or cool the fluid.

11. The electronic communication apparatus as claimed in claim 10, wherein the temperature sensor is a thermistor disposed on at least one of the second surface and the fourth surface.

12. The electronic communication apparatus as claimed in claim 10, wherein the temperature sensor is a capacitive sensor comprising:
    a first electrode disposed on the first surface; and
    a second electrode disposed on the third surface, wherein the second electrode faces the first electrode.

13. The electronic communication apparatus as claimed in claim 10, further comprising:
    a signal control circuit coupled to at least one of the first radiator and the second radiator;
    a temperature control circuit controlling the heater-cooler device to heat or cool the fluid according to a sense signal that comes from the temperature sensor.

14. The electronic communication apparatus as claimed in claim 13, wherein the signal control circuit comprises:
    a radio-frequency-or-millimeter-wave signal control circuit controlling the first radiator and the second radiator to generate the wireless signals; and
    a liquid-crystal control circuit controlling the direction of liquid-crystal molecules of the liquid-crystal layer.

15. The electronic communication apparatus as claimed in claim 13, wherein the signal control circuit and the temperature control circuit are disposed in the container.

16. The electronic communication apparatus as claimed in claim 13, wherein the signal control circuit and the temperature control circuit are disposed outside the container.

17. The electronic communication apparatus as claimed in claim 10, wherein the heater-cooler device is a heat exchanger.

18. The electronic communication apparatus as claimed in claim 10, further comprising:
 a housing covering the container; and
 a heat insulation layer located between the container and the housing.

\* \* \* \* \*